United States Patent [19]

Schmelzer et al.

[11] 4,022,940

[45] May 10, 1977

[54] METHOD OF PRINTING A PAPER TO SIMULATE THE APPEARANCE OF A FOAMED POLYPROPYLENE SHEET AND ARTICLE PRODUCED THEREBY

[75] Inventors: Michael Arthur Schmelzer, Neenah; Ronald Eugene Wenzel; Robert John Weyenberg, both of Appleton all of Wis.

[73] Assignee: American Can Company, Greenwich, Conn.

[22] Filed: Nov. 3, 1975

[21] Appl. No.: 628,500

[52] U.S. Cl. ............................... 527/262; 427/280; 427/288; 428/211; 428/333

[51] Int. Cl.$^2$ ..................... B05D 5/06; B32B 29/06

[58] Field of Search .................. 427/262, 267, 280; 428/195, 211, 333; 427/283, 288

[56] References Cited

FOREIGN PATENTS OR APPLICATIONS 315,385 6/1929 United Kingdom ............... 427/267

*Primary Examiner*—Ronald H. Smith
*Assistant Examiner*—Evan K. Lawrence
*Attorney, Agent, or Firm*—Robert P. Auber; Ira S. Dorman; George P. Ziehmer

[57] ABSTRACT

This invention relates to an inexpensive, printed paper sheet material which has an appearance closely simulating that of foamed polypropylene. The product is prepared by coating a paper sheet with an overall coating of a pearlescent ink and then overprinting the pearlescent coating with a dilute black ink in a fine mottled pattern.

5 Claims, 1 Drawing Figure

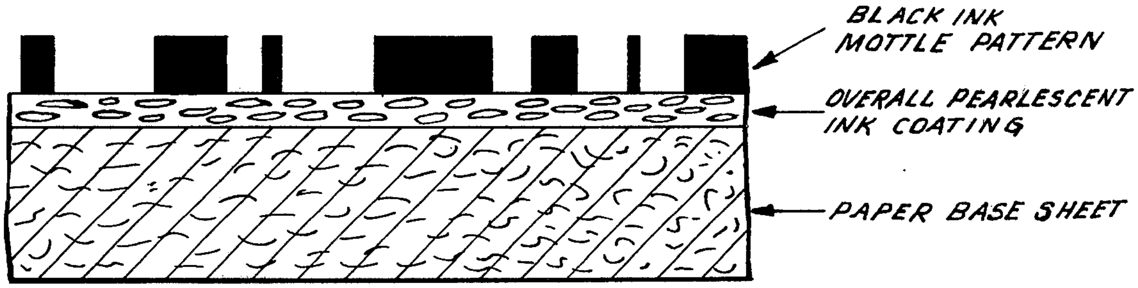
BLACK INK
MOTTLE PATTERN
OVERALL PEARLESCENT
INK COATING
PAPER BASE SHEET

METHOD OF PRINTING A PAPER TO SIMULATE THE APPEARANCE OF A FOAMED POLYPROPYLENE SHEET AND ARTICLE PRODUCED THEREBY

BACKGROUND OF THE INVENTION

This invention relates to a process for simulating the appearance of a surface of foamed polypropylene sheet material of a few mils in thickness by printing on a substantially white paper substrate an overall coating of a pearlescent ink and overprinting the pearlescent ink with a dilute black ink in a fine mottled pattern.

In recent years the technology for forming foamed plastic sheets and webs of organic polymeric resins has developed to the point where a substantial number of foamed polymers are available in sheets or webs of various thicknesses for use in a wide variety of applications. Among the more popular foamed plastics if foamed polypropylene which is in substantial demand in webs of a few mils in thickness for use as a packaging material because of its high visual impact and great aesthetic appeal. Foamed polypropylene, either as a self-supporting web or laminated to a suitable substrate such as paper, metal foil or an unfoamed plastic film, has seen its greatest use as a packaging material in the cosmetic field, where the eye appeal of the package is considered to be of great significance in promoting the sale of the product. To this end, luxury bath soaps and other cosmetic products have been packaged in foamed polypropylene because of its velvety sheen which visually imparts the aura of high quality to the product packaged therein.

Foamed polypropylene web stock is, however, a relatively expensive packaging material and it would be desirable if a low-priced substitute material were available which would impart to the beholder the same degree of aesthetic appeal.

Furthermore, foamed polypropylene represents a difficult surface on which to print. The sheet lacks desirable dimensional stability, the surface is quite uneven and the polymer is chemically inert. For these reasons foamed polypropylene sheet material is not ideally suited to the development thereon of the high quality printed images which would be desirable in the decorative and informative indicia associated with the packaging of cosmetic items. It would therefore be highly advantageous if a packaging material could be developed which retained the visual appeal of foamed polypropylene and at the same time presented a superior base for acceptance of very high quality printing such as that obtained through the use of 200 lines per inch rotogravure process printing on a coated paper substrate.

It is therefore an object of this invention to provide a process whereby the appearance of a foamed polypropylene surface may be accurately simulated on an inexpensive paper substrate on which may also be produced process printed images if very high quality. Further objects will become apparent from the following specification and claims.

In an effort to achieve the surface appearance of rare or expensive materials such as finely grained woods, fine fabrics or laces, for example, techniques have been developed which involve photographing the original specimen of the material to be simulated and then, through known printing techniques, reproducing the appearance of the original material as a printed image on paper or a similarly inexpensive substrate. In the case of a simulated wood grain material, for example, the printed paper carrying the image of an expensive, finely grained wood may then be laminated to the surface of an inexpensive wood, chipboard or plastic and overcoated with lacquer or varnish to simulate the appearance of the more expensive original wood grain. This art has achieved such a high degree of success that it is often difficult to distinguish between the original piece of wood and the copy thereof which incorporates a printed paper simulation of the original. Attempts have also been made to simulate the appearance of a foamed polypropylene surface, utilizing the proven techniques of photographing the desired original surface, subjecting the photograph to known color separation procedures to obtain screened negatives and then reproducing the image by multi-color process printing, which procedures have been so successful in the simulation of the appearance of fine grained wood, for example. These attempts have been unsuccessful in the case of foamed polypropylene, the printed image failing to resemble the original surface with any reasonable degree of accuracy, so that no successful printed simulation of a foamed polypropylene surface has hitherto been available.

SUMMARY OF THE INVENTION

It has now been found, however, that a low-cost, simulated image of a foamed polypropylene surface may be obtained through the process of this invention, which image is substantially indistinguishable in appearance from the original subject. The appearance of foamed polypropylene may be accurately simulated by coating a substantially white, printing grade of paper with an overall coating of a pearlescent ink and subsequently overprinting the pearlescent coating with a dilute blank ink in a fine mottle pattern which mutes the pearlescene and gives a desirable three-dimensional appearance to the printed surface. The mottle pattern comprises randomly spaced individual mottle elements of varying size and shape which, in an overall printing of the mottle pattern, cover up to 75 percent of the pearlescent coating with a shadowy image of the mottle pattern. The result is an accurate simulation of a foamed polypropylene sheet material surface.

BRIEF DESCRIPTION OF THE DRAWING

The drawing depicts a greatly enlarged cross-sectional view of the simulated foamed polypropylene sheet.

DESCRIPTION OF A PREFERRED EMBODIMENT OF THE INVENTION

The process by which this desired result is obtained involves the utilization, as a substrate, of a substantially white, printing grade of paper. The desired degree of whiteness and the proper surface texture of the paper sheet to receive high quality printing may be achieve either by suitable sizing and on-the-machine coatings of high titanium dioxide content or by an off-the-machine application of an overall coating of an opaque white printing ink. In any case, the optical density reading of the paper, as measured by known techniques decribed hereinafter, should range no higher than 0.12 and preferably will be between 0.03 and 0.08.

The substantially white paper substrate is then printed with an overall coating of a pearlescent ink such as that sold commercially by M&T Chemicals Inc. , Rahway, New Jersey, under the trade designation EW-579 Ink. Substantially equivalent pearlscent inks are also obtainable from Thiele-Engdahl, Inc. , 669 Winthrop Avenue, Addison, Illinois, under the designation AJX-7986 Pearl Ink and from M&T Chemicals Inc., under the designation EW-624 Ink. The ink is applied to the paper in sufficient amount to give an overall pearlscent appearance to the sheet. The ink may be applied by any of the standard printing processes, including rotogravure, lithographic or letterpress processes. As a particular example, the ink sold by M&T Chemicals Inc. under the trade designation EW-624 may be applied by rotogravure procedures to a sheet of white, printing grade paper of about 33 lbs. per ream in weight and having an optical density of 0.05. If the ink is applied in an overall pattern in an amount to leave between 0.5 and 4 pounds/ream (solids basis) on the sheet, the resulting pearlescent printed sheet will have an optical density of between 0.1 and 0.2 as measured on a light reflectance instrument equipped with a Wratten No. 106 filter calibrated to give a zero reading from a barium sulfate surface. The particular instrument used in this and other optical density measurements mentioned herein was a Model 126P Reflectance Densitometer manufactured and sold by Graphic Arts Manufacturing Co., 2518 South Boulevard, Houston, Texas.

It has been found that in order to accurately simulate the appearance of a foamed polypropylene surface with a paper printed in accordance with the process of this invention, the coated paper sheet, at the stage where it bears an overall coating of pearlescent ink, must have an optical density, measured as described hereinbefore, of between about 0.10 and 0.20 on a scale ranging from zero (for pure white barium sulfate) to 2.0 (for dense black). Preferably, the optical density should range between 0.13 and 0.16 on the above scale.

In order to modify the overall pearlscent appearence of the coated paper sheet to closely simulate a foamed polypropylene surface, it is necessary to overprint the pearlescent ink with a black ink or colored ink approaching black in hue in an overall pattern of irregular, spaced mottles which cover from about 30% up to about 75% of the surface of the sheet, the individual, irregularly shaped mottle elements having a maximum dimension ranging from about 0.2 to 1.5 mm. The black or very dark colored ink is sufficiently diluted so that it is not opaque in the printed areas, but merely mutes or subdues the pearlescent appearance wherever an individual mottle element overlies the pearlescent ink. The dilution of the black ink and the percentage of the surface of the overall pearlescent coating which is overlain by the individual blank ink mottle elements are so adjusted that optical density of the resultant sheet is increased over that of the pearlescent coated sheet by between 0.01 and 0.07 units.

That is, if the paper sheet having an overall coating of pearlescent ink has an optical density of 0.15, for example, the same sheet having a mottled black overprint superposed on the pearlescent coating should have an optical density of between 0.16 and 0.22 in order that the final printed sheet most closely ressemble a foamed polypropylene sheet of the type used in packaging cosmetic items. A printed paper sheet prepared as outlined above will be found to visually virtually indistinguishable from the unsupported foamed polypropylene sheet material of 2 to 5 mil thickness sold by Sun Chemical Corporation, Paterson, New Jersey, under the designated Pearl White Deloura Foam Polypropylene or from the unsupported foamed polypropylene sheet material of 5 mil thickness sold by the H. P. Smith Company, 5001 W. 66th Street, Chicago, Illinois, and designated as 5-mil Natural Foam Polypropylene.

Similar results will be obtained if the optical density of the pearlescent printed paper sheet is maintained between 0.10 and 0.20, the mottled black overprint increasing the optical density of the final printed sheet so that it ranges between a minimum value of 0.11 and a maximum value of 0.27.

The mottled pattern which is used for the black overprint may be obtained in a number of ways, it being necessary only that the pattern shown no geometric regularity and that the size of the individual mottle imprints vary within the limits of about 0.2 and 1.5 mm. in maximum dimension, as heretofore mentioned. A photograph of a suitably mottle surface may be utilized in the preparation of the printing surface, the mottles being enlarged or reduced photographically as desired in the course of transferring the photographed pattern onto a printing plate surface.

Somewhat unexpectedly, a very satisfactory mottled pattern may be obtained by photographing a small section of closely woven fabric bearing a random pattern of varicolored yarn. The resulting photograph may be used in known manner as the pattern which is transferred to a rotogravure cylinder and the resulting mottled pattern etched therein. The cylinder may then be used to overprint the black mottle pattern on paper previously printed with an overall coating of pearlescent ink, as previously described.

The mottled pattern is overprinted on the pearlescent surface in black, very dark brown, midnight blue or other ink of sufficiently dark hue to appear substantially black or equivalent thereto in a printed image. Since the mottle pattern image is very lightly printed using a dilute ink, the pattern is not opaque but merely mutes or softens the pearlescent appearance in the overprinted areas, giving the effect of shadows on the surface and imparting an appearance of three dimensionalism to the printed sheet material surface. This is essential in creating an accurate visual simulation of the surface uneveness which is characteristic of foamed polypropylene.

The desired degree of shadowing by use of the mottle pattern is achieved by a proper balance of the intensity of the printed mottle image and the percentage of overall area covered by the individual elements of the printed mottle pattern. In general, the stronger or more intense the image of each mottle element is, the more widely spaced the elements should be and the smaller the percentage of the overall surface which will be covered by the printed mottle image elements. Conversely, if a more dilute ink is used, the printed mottle images will be less intense, or weaker, and a higher percentage of the overall pearlescent surface area must be covered with the mottle image elements in order to achieve the desired shadow effect. The balancing of image intensity and degree of surface coverage must be achieved within certain limits, however, since if too high a percentage of the pearlescent surface is covered with mottle pattern image elements, the shadow effect is lost and the pearlescent surface merely appears dull and "muddy. " Conversely, if the mottle element images are too intense, the individual elements become apparent to the observer and the coated sheet material assumes a speckled appearance. In general, it has been found that the mottle image overprint should cover between about 35 and 75 percent of the overall surface area, with about 50 to 65 percent coverage being preferred. In each case, the intensity of the image is adjusted by varying the ink concentration to achieve an increase in optical density caused by the mottle pattern image of between 0.01 and 0.07 over that measured on the pearlescent coated surface before overprinting with the mottle pattern, the optimum optical density increase being in the range of about 0.03 to 0.05.

The foregoing disclosure having described in detail a preferred embodiment of the invention as exemplarly thereof, it is to be understood that it is intended to cover those changes and modification which do not constitute departures from the spirit and scope of the invention as set forth in the appended claims.

We claim:

1. A method for simulating the appearance of a foamed polypropylene sheet material, comprising applying on the surface of a substantially white printing grade paper having an optical density of less than 0.12 as measured by a reflectance densitometer calibrated on a scale ranging from 0. to 2.0 from dead white to dense black, respectively, an overall coating of a pearlescent ink to form a pearlescent coated surface having an optical density of between about 0.10 and 0.20 and subsequently overprinting between about 30 and 75 percent of said pearlescent surface with an ink of substantially dark hue in a mottled pattern of irregular elements, the individual elements of said pattern varying in size from about 0.2 to about 1.5 mm. in their greatest dimension, the mottled overprint being applied in an amount sufficient to increase the optical density of the overprinted surface by from 0.01 to 0.07 over the optical density of the pearlescent ink coated surface.

2. A method in accordance with claim 1 wherein said pearlescent coating is applied on said paper in an amount between about 0.5 and about 4 pounds, solid basis, per ream of 3,000 square feet.

3. A method in accordance with claim 2 wherein the mottle pattern overprint is applied so that the sum of the area covered by the individual elements of the mottle pattern constitutes between 35 and 65 percent of the total surface of the overall pearlescent coated paper sheet material.

4. A paper sheet material printed to accurately simulate the appearance of a thin web of foamed polypropylene and comprising: a substantially white printing grade paper having an optical density of less than about 0.12 as measured by a reflectance densitometer calibrated on a scale wherein barium sulfate has an optical density of 0.0 and a dense black surface has a optical density of 2.0, said paper having an overall coating of a pearlescent ink having an optical density of between about 0.1 and 0.2, said pearlescent coating having between about 35 and 75 percent of its surface overprinted in a fine mottle pattern of irregular elements ranging is size from about 0.2 to about 1.5 mm. in their greatest dimension with an ink of substantially dark hue applied in an amount sufficient to increase the optical density of the overprinted sheet by from 0.01 to 0.07 as compared to the optical density of the pearlescent coated paper sheet.

5. A sheet material in accordance with claim 4 wherein said pearlescent coating has an optical density of between about 0.13 and 0.16 and said mottle pattern overprint covers from about 50 to about 65 percent of said pearlescent coating surface and increases the optical density of the overprinted pearlescent coated sheet by an amount between 0.03 and 0.05 as compared to the pearlescent coating surface prior to overprinting.

* * * * *